United States Patent
Matsumoto et al.

(10) Patent No.: US 7,923,665 B2
(45) Date of Patent: Apr. 12, 2011

(54) TEMPERATURE MEASURING DEVICE AND METHOD FOR MEASURING WAFER-TYPE THERMOMETERS

(75) Inventors: Toshiyuki Matsumoto, Sanda (JP); Tomohide Minami, Nishinomiya (JP)

(73) Assignee: Tokyo Electron Limited (JP)

( * ) Notice: Subject to any disclaimer, the term of this patent is extended or adjusted under 35 U.S.C. 154(b) by 1140 days.

(21) Appl. No.: 11/645,616

(22) Filed: Dec. 27, 2006

(65) Prior Publication Data

US 2007/0147468 A1 Jun. 28, 2007

(30) Foreign Application Priority Data

Dec. 28, 2005 (JP) ................. 2005-376948

(51) Int. Cl.
*H05B 1/02* (2006.01)
(52) U.S. Cl. ... 219/497; 219/501; 219/209; 156/345.27; 257/713; 257/717; 374/120
(58) Field of Classification Search .................. 219/497, 219/501, 483, 486, 494, 209, 210; 374/101, 374/102, 120; 257/728, 717; 118/724, 725; 156/345.27, 345.53, 345.3
See application file for complete search history.

(56) References Cited

U.S. PATENT DOCUMENTS

| 5,994,679 | A | * | 11/1999 | DeVeau et al. | ................. 219/530 |
| 7,646,135 | B1 | * | 1/2010 | Churchill et al. | ......... 310/313 R |
| 2001/0040154 | A1 | * | 11/2001 | Hashimoto et al. | ........... 219/210 |
| 2004/0000713 | A1 | | 1/2004 | Yamashita et al. | |
| 2008/0031305 | A1 | * | 2/2008 | Kobayashi | ................... 374/208 |

FOREIGN PATENT DOCUMENTS

| JP | 2002-124457 | 4/2002 |
| JP | 2004-024551 | 1/2004 |

* cited by examiner

*Primary Examiner* — Mark H Paschall
(74) *Attorney, Agent, or Firm* — Finnegan, Henderson, Farabow, Garrett & Dunner, LLP

(57) ABSTRACT

An object of the present invention is to provide a wafer-type thermometer capable of adapting itself to automation and improving the heat resistance to measure temperature distribution of a wafer and a method for manufacturing the wafer-type thermometer. A plurality of temperature sensors are arranged in regions formed by segmenting the upper surface of a wafer into a plurality of regions. Output signals from the plurality of temperature sensors are converted into temperature data by a conversion processing circuit where further processes the temperature data. The conversion processing circuit is housed in a storage room surrounded by a heat insulating member made of a nanocrystalline silicon layer.

9 Claims, 12 Drawing Sheets

TEMPERATURE MEASURING DEVICE AND METHOD FOR MEASURING WAFER-TYPE THERMOMETERS

BACKGROUND OF THE INVENTION

1. Field of the Invention

This invention relates to a temperature measuring device and a method for manufacturing wafer-type thermometers, and for example, relates to a temperature measuring device for measuring the temperature of a heating plate in use for heating wafers and a method for manufacturing the wafer-type thermometers.

2. Description of Background Art

In a photolithography process during the manufacture of semiconductor devices, various thermal treatments, including a heat treatment (pre-bake) which is performed after the application of resist solution onto a surface of a semiconductor wafer (hereinafter referred to as "wafer"), a heat treatment (post-exposure-bake) which is performed after exposing patterns, and a cooling treatment which is performed after each heat treatment, are carried out by, for instance, a heating/cooling system capable of maintaining the wafer at a predetermined temperature.

FIG. 15 is a vertical cross-sectional view of a conventional heating/cooling system 60, while FIG. 16 is a transverse sectional view taken along lines A-A of FIG. 15.

FIG. 15 shows that a heating/cooling system 60 has an enclosure 90 including therein a cooling plate 61 for use in cooling wafers and a heating plate 62 for use in heating wafers juxtaposed to the cooling plate 61. The cooling plate 61 and heating plate 62 are discs with a certain thickness. The cooling plate 61 incorporates some devices such as a Peltier device (not shown) for cooling the cooling plate 61 to a predetermined temperature.

Under the cooling plate 61 provided are elevator pins 63 for supporting and moving up and down the wafer to mount the wafer on the cooling plate 61. These elevator pins 63, which can be moved upward and downward by a vertical drive mechanism 64, are configured to penetrate the cooling plate 61 from the bottom so as to protrude through the upper surface of the cooling plate 61.

On the other hand, the heating plate 62 incorporates a heater 65 and a heating-plate temperature sensor 62a. The temperature of the heating plate 62 is maintained at a preset temperature by a controller 66 that controls the heating value of the heater 65 based on the temperature sensed by the heating-plate temperature sensor 62a. As with the cooling plate 61, elevator pins 67 and a vertical drive mechanism 68 are provided under the heating plate 62. These elevator pins 67 allow the wafer to be mounted on the heating plate 62.

As shown in FIG. 16, a transfer device 69 is disposed between the cooling plate 61 and heating plate 62 to transfer a wafer to the heating plate 62 and to transfer the wafer from the heating plate 62 to the cooling plate 61. A transfer opening 70 is formed in the enclosure 90 of the heating/cooling system 60 and adjacent to the cooling plate 62, for bringing the wafer in and taking the wafer out of the heating/cooling system 60.

In addition, this transfer opening 70 is attached with a shutter 71 to maintain the heating/cooling system 60 to have a predetermined atmosphere. A transfer arm 80, which is placed opposite the shutter 71, transfers the wafer through the transfer opening 70 into the heating/cooling system 60 when the shutter 71 is opened. The transferred wafer is further transferred by the transfer device 69 onto the heating plate 62.

The importance in the use of such a heating/cooling system 60 is to measure temperature distribution of the wafer mounted on the heating plate 62 in advance to grasp temperature characteristics of the wafer on the heating plate 62 and to heat the wafer on the heating plate 62 uniformly with appropriate compensation based on the results. In order to measure the temperature distribution of the wafer on the heating plate 62, temperature measuring devices have been conventionally used to grasp the temperature distribution of the wafer and adjust the temperature distribution before the actual treatment of the wafer.

FIG. 17 illustrates some examples of the conventional temperature measuring device. As shown in FIG. 17A, a transmitting device 103 that is connected to each temperature sensor 101 via a cable 102 is disposed on a wafer K for use in measuring temperature. Data detected by each temperature sensor 101 is sent from the transmitting device 103 by radio and then received by a receiving device disposed inside or outside the heating/cooling system 60 by radio.

An example of the devices for transmitting the detected temperature data by radio is the semiconductor device for sensor system as disclosed in Japanese unexamined patent publication No. 2004-24551. This semiconductor device for sensor system includes an A/D conversion circuit, memory, transmitter circuit formed on one surface of a substrate and a power generator on the other surface of the substrate. However, the A/D conversion circuit that deteriorates conversion accuracy with an increase in temperature may be able to be used to measure temperatures up to about 150 degrees C., but cannot be used in the atmosphere at temperatures rising to 250 degrees C. Therefore, the semiconductor device for sensor system disclosed in the publication may be used for the transmitting device 103 shown in FIG. 17A, but cannot be used under high temperature conditions, for example at 250 degrees C.

Japanese unexamined patent publication No. 2002-124457 discloses another example as shown in FIG. 17B in which the transmitting device 103 shown in FIG. 17A is disposed on a disc S that is prepared in addition to the temperature-measuring wafer K and each temperature sensor 101 on the temperature-measuring wafer K is connected to the transmitting device 103 via cables 102. Since this example is configured to mount only the temperature-measuring wafer K on the heating plate 62 and to locate the disc S above the temperature measuring wafer K with a distance therebetween, the A/D converter can keep a distance from the heating plate 62, and therefore the A/D converter incorporated in the transmitting device 103 is prevented from accuracy deterioration caused by high temperature.

However, the temperature-measuring wafer K with the disc S located thereabove causes difficulty in transferring wafers with the transfer device 69 and transfer arm 80 shown in FIG. 16, thus requiring a specially prepared transfer device and transfer arm, which increases the cost.

SUMMARY OF THE INVENTION

A wafer-type thermometer according to the present invention comprises a wafer, a plurality of temperature sensors arranged in regions that are formed by segmenting the upper surface of the wafer into a plurality of regions, a conversion processing circuit configured to convert output signals from the plurality of temperature sensors into temperature data and processing the temperature data, and a storage room provided on the wafer. The storage room is surrounded by a heat insulating member made of a nanocrystalline silicon (nc-Si) layer and houses the conversion processing circuit.

The wafer-type thermometer according to another aspect of the present invention comprises a wafer, a plurality of temperature sensors arranged in regions that are formed by segmenting the upper surface of the wafer into a plurality of regions, conversion processing circuit configured to convert output signals from the plurality of temperature sensors into temperature data and processing the temperature data, a storage room provided in the wafer, surrounded by a heat insulating member, and housing the conversion processing circuit, and a Peltier thermobattery housed in the storage room so as to expose a part thereof from the storage room to the outside of the wafer and generating a voltage in response to a temperature difference between the temperature inside the heat insulating member and the temperature outside the heat insulating member to supply the voltage as power supply voltage to the conversion processing circuit. The incorporated Peltier thermobattery has a longer life than commonly-used batteries.

DESCRIPTION OF PREFERRED EMBODIMENT

An object of the present invention is to provide a wafer-type thermometer capable of adapting itself to automation and improving the heat resistance to measure temperature distribution of a wafer, and a method for manufacturing the wafer-type thermometer.

Figure 1:
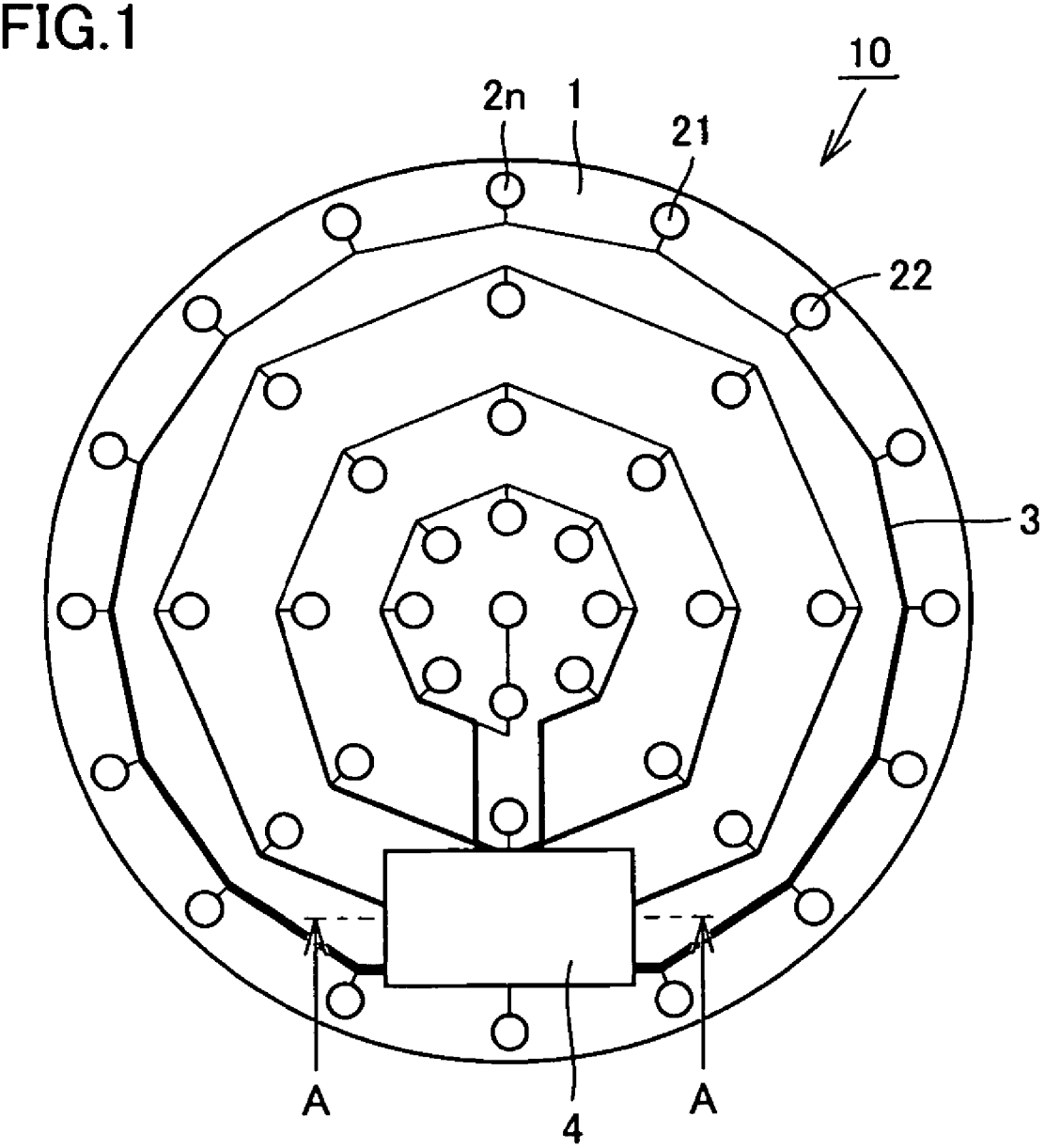
FIG. 1 is an external view of a wafer-type thermometer according to one embodiment of the invention.

FIG. 1 is an external view of a wafer-type thermometer according to one embodiment of the invention.

In FIG. 1, a wafer-type thermometer 10 includes a wafer 1, temperature sensors 21, 22 to 2n, a conversion processing circuit 4. The wafer 1 is segmented into a plurality of regions in which the temperature sensors 21, 22 to 2n are arranged individually. Each of the temperature sensors 21, 22 to 2n is connected to the conversion processing circuit 4 via wires 3. The conversion processing circuit 4 converts analog signals, which are output values from the respective temperature sensors 21, 22 to 2n, into digital signals to output them. The conversion processing circuit 4 is housed in a storage room, as will be described later with reference to FIG. 3, having a heat-insulated structure.

Figure 15:
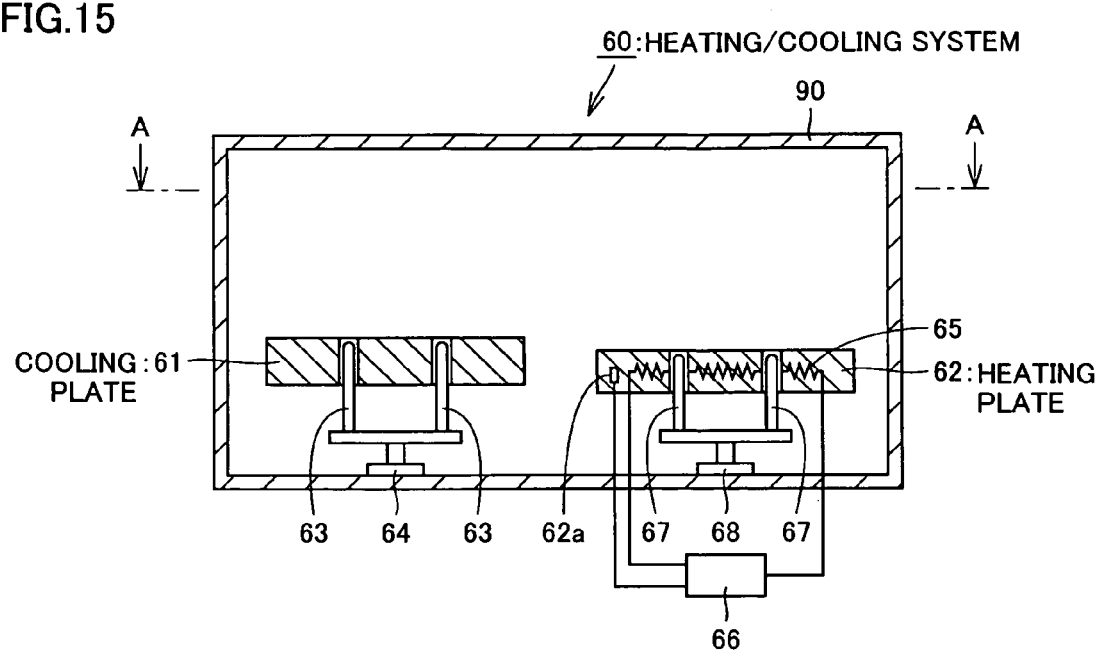
FIG. 15 is a vertical cross-sectional view of a conventional heating/cooling system.

The wafer-type thermometer 10 mounted on the heating plate 62 shown in FIG. 15 measures temperature distribution of the wafer prior to the actual treatment of wafers on the heating plate 62 in order to grasp the temperature characteristics of the wafer on the heating plate 62. Then, the wafer-type thermometer 10 makes an appropriate temperature adjustment based on the detection results and determines a temperature capable of uniformly heating the wafer to be treated on the heating plate 62. Any detecting elements can be applied to the temperature sensors 21, 22 to 2n, for example, thermocouples and resistance temperature detectors (RTDs), as long as the detecting elements can detect temperature changes. Hermetically embedding the temperature sensors 21, 22 to 2n in a surface of the wafer 1 prevents the temperature sensors 21, 22 to 2n from deterioration even in a hot gas atmosphere.

Figure 2:
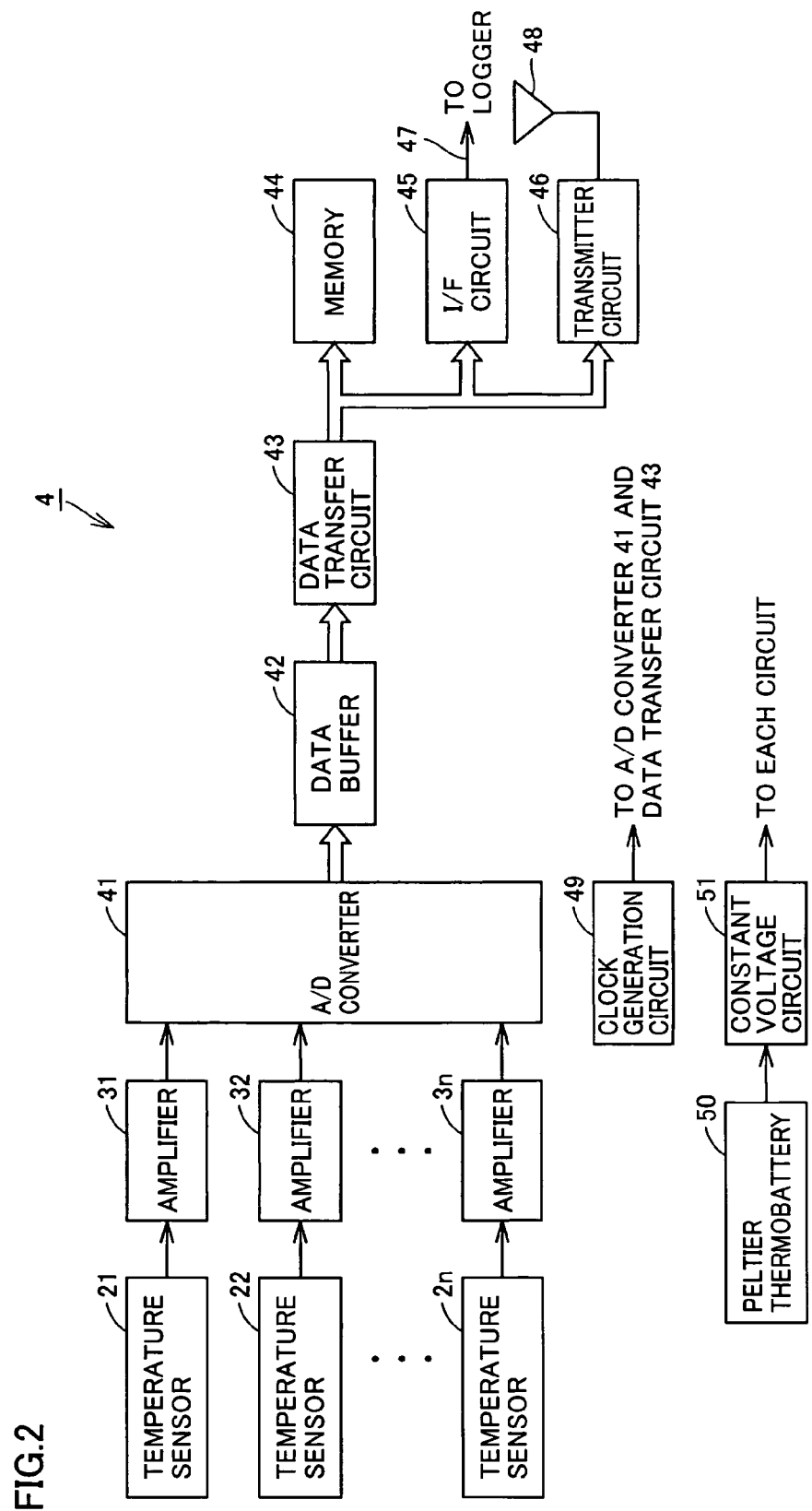
FIG. 2 is a circuit diagram illustrating the conversion processing circuit shown in FIG. 1

FIG. 2 is a circuit diagram illustrating the conversion processing circuit 4 shown in FIG. 1. In FIG. 2, output signals of the temperature sensors 21, 22 to 2n shown in FIG. 1 are input into amplifiers 31, 32 to 3n, respectively, to be amplified and fed to an A/D converter 41. The A/D converter 41 converts analog signals that are the output signals of the temperature sensors 21, 22 to 2n into parallel digital data to output them. The converted digital data are fed to a data transfer circuit 43 via a data buffer 42.

The data transfer circuit 43 transfers the digital data to a memory 44, I/F circuit 45 and transmitter circuit 46. The memory 44 is, for example, a nonvolatile memory and stores the temperature data detected by the respective temperature sensors. The I/F circuit 45 outputs the temperature data by wire. To output the temperature data by wire, the output of the I/F circuit 45 is connected with a cable 47. The transmitter circuit 46 transmits the temperature data by radio. To transmit the temperature data by radio, the transmitter circuit 46 is connected with an antenna 48. It should be noted that the memory 44, I/F circuit 45 and transmitter circuit 46 are not always needed, but can be selectively provided on an as-needed basis.

A clock generation circuit 49 generates clock signals to supply them to the A/D converter 41 and data transfer circuit 43. A Peltier thermobattery 50 is provided to supply power supply voltage to each circuit. The Peltier thermobattery 50 including a Peltier element induces a voltage in response to a temperature difference between the high temperature outside the wafer 1 and the low temperature inside the wafer 1. For example, the Peltier thermobattery 50 can generate an output voltage of 3 V to 4 V with a temperature difference of 130 degrees C. The voltage generated by the Peltier thermobattery 50 is fed to a constant voltage circuit 51.

The constant voltage circuit 51 regulates the voltage generated by the Peltier thermobattery 50 to a constant voltage to supply it to each circuit. The Peltier thermobattery 50 can be replaced with a commonly-used battery. In the case where the output of the I/F circuit 45 is taken out by wire, the power supply voltage can be supplied to the conversion processing circuit 4 by wire, and therefore there is no need to incorporate the Peltier thermobattery 50 and the commonly-used battery.

Additionally, all elements in the conversion processing circuit 4 shown in FIG. 2 are formed on an integrated circuit except for the Peltier thermobattery 50.

Figure 3:
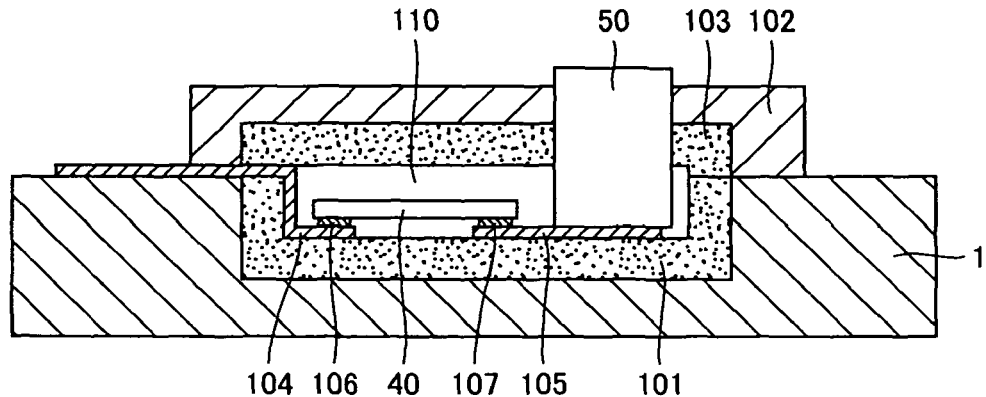
FIG. 3 is a cross-sectional view of the storage room on the wafer taken along lines A-A shown in FIG. 1.

FIG. 3 is a cross-sectional view of the storage room 110 on the wafer 1 taken along lines A-A shown in FIG. 1. In FIG. 3, the wafer 1 is provided with the storage room 110 for housing the integrated circuit 40 on which the conversion processing circuit 4 shown in FIG. 2 is packed and the Peltier thermobattery 50. The bottom and sides of the storage room 110 are surrounded by a heat insulating layer 101. The storage room 110 is covered with a substrate 102, functioning as a cap member, in which a heat insulating layer 103 is formed so as to cover the top of the storage room 110. The heat insulating layers 101 and 103 are made of an nc-Si (nanocrystalline silicon) layer. The substrate 102 and the heat insulating layer 103 have an opening (not shown).

At the bottom of the storage room 110 a wiring conductor 105 is formed. The wiring conductor 105 has one end connected to an electrode (not shown) of the Peltier thermobattery 50 and the other end connected to the integrated circuit 40 with conductive paste 107. In addition, a wiring conductor 104 for connecting the cable 47 and the I/F circuit 45 shown in FIG. 2 is formed so as to extend from the bottom of the storage room 110 to the surface of the wafer 1 through the heat insulating layer 101 and wafer 1. The wiring conductor 104 and integrated circuit 40 are connected to each other with conductive paste 106.

The Peltier thermobattery 50 is placed in the storage room 110 with its top part exposed outside the wafer 1 through the opening. The Peltier thermobattery 50 generates a power supply voltage when subjected to a temperature difference between the temperature outside the wafer 1 and the temperature inside the storage room 110 to supply the power supply voltage to the integrated circuit 40. In the example shown in FIG. 3, because the storage room 110 for housing the integrated circuit 40 is surrounded by the heat insulating layers 101 and 103, the A/D converter 41 in the integrated circuit 40 is not exposed to high heat, thereby preventing deterioration of the conversion accuracy of the A/D converter 41. Moreover, the Peltier thermobattery 50 used as a power source of the conversion processing circuit 4 has a longer life than the commonly-used batteries.

By forming the storage room with the heat insulating member made of the nanocrystalline silicon layer to house the conversion processing circuit, heat resistance is improved, thereby preventing the deterioration of conversion accuracy of the conversion processing circuit even under high temperature conditions.

Figure 4:
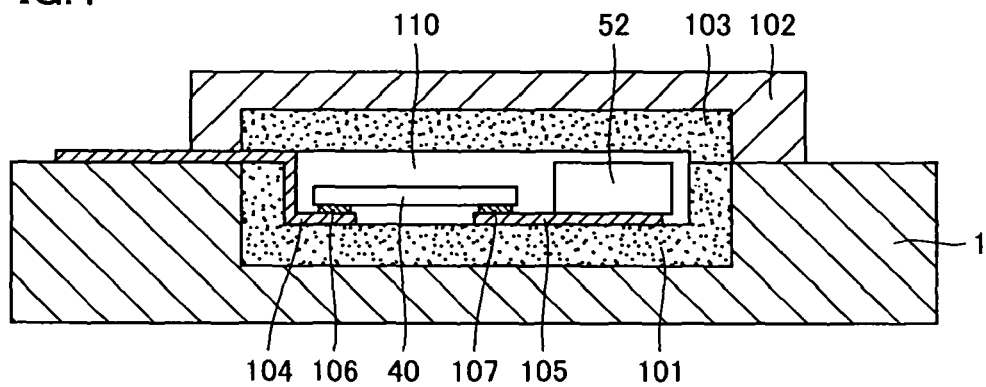
FIG. 4 is a cross-sectional view of another example of the storage room shown in FIG. 3.

FIG. 4 is a cross-sectional view of another example of the storage room shown in FIG. 3. The example shown in FIG. 4 includes a commonly-used battery 52 in the storage room 110 instead of the Peltier thermobattery 50 shown in FIG. 3. The other elements of the example shown in FIG. 4 are the same as those of the example shown in FIG. 3. This example can reduce cost by using the commonly-used battery 52 instead of the Peltier thermobattery 50.

Figure 5:
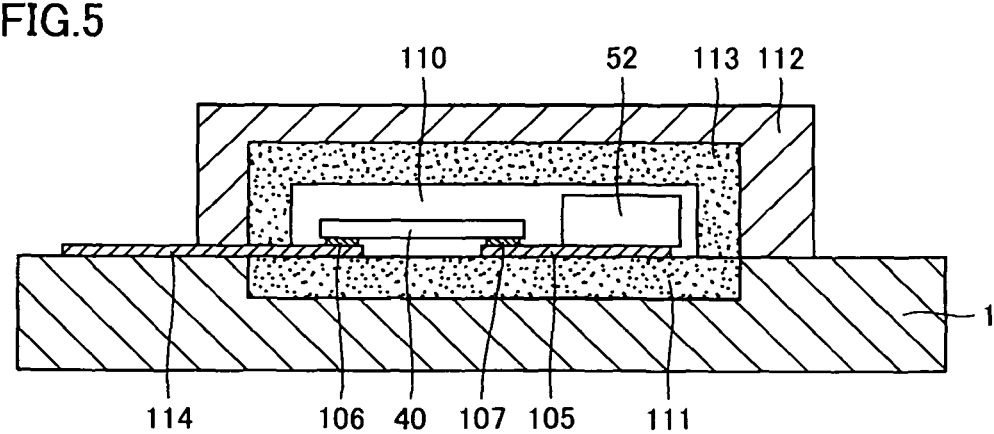
FIG. 5 illustrates yet another example of the storage room shown in FIG. 3.

FIG. 5 illustrates yet another example of the storage room 110. On the contrary to the examples shown in FIGS. 3 and 4 in which the storage room 110 is formed in the wafer 1, the example shown in FIG. 5 includes the storage room 110 in the substrate 112. Specifically, a heat insulating layer 111 is formed on the upper surface of the wafer 1, and the wiring conductors 105 and 114 are formed on the heat insulating layer 111. The wiring conductor 105 has one end connected to an electrode (not shown) of the battery 52 and the other end connected to the integrated circuit 40 with conductive paste 107. One end of the wiring conductor 114 is connected to the integrated circuit 40 with conductive paste 106.

The substrate 112, functioning as a cap member, with a storage room 110 formed therein covers the integrated circuit 40 and battery 52. A heat insulating layer 113 is formed at the bottom and sides of the storage room 110 in the substrate 112. Because the storage room 110 for housing the integrated circuit 40 in the example shown in FIG. 5 is also surrounded by the heat insulating layers 111 and 113, the A/D converter 41 in the integrated circuit 40 is not exposed to high heat, thereby preventing deterioration of the conversion accuracy.

Figure 6A:
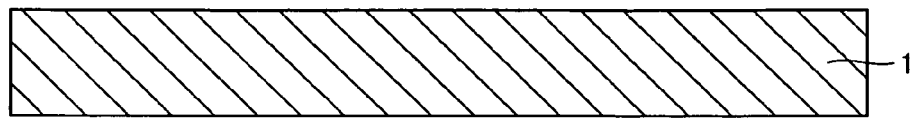
FIGS. 6A and 6B illustrate a process for forming a heat insulating layer on a wafer.
Figure 6B:
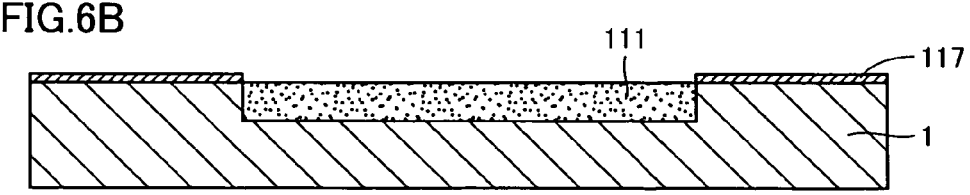
Figure 7A:
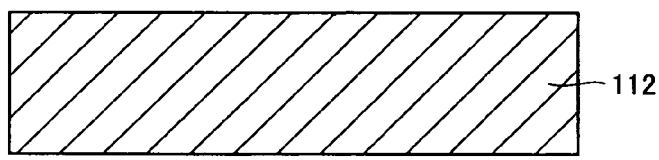
FIGS. 7A, 7B, 7C, 7D illustrate a process for forming a heat insulating layer on a substrate.
Figure 7B:
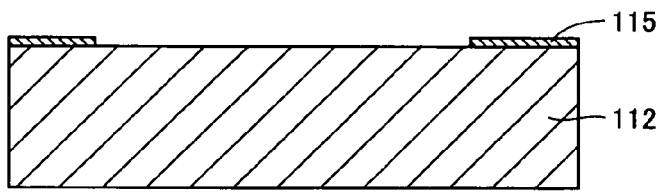
Figure 7C:
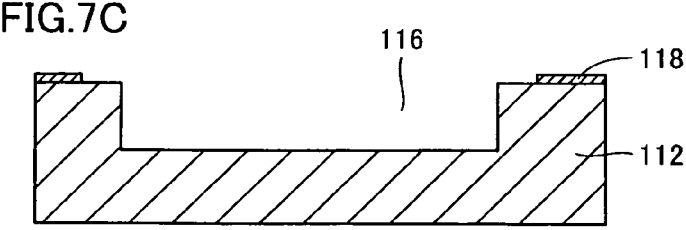
Figure 7D:
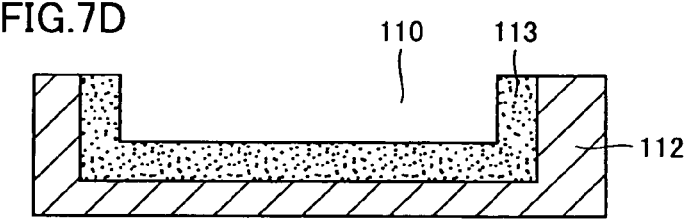
Figure 8A:
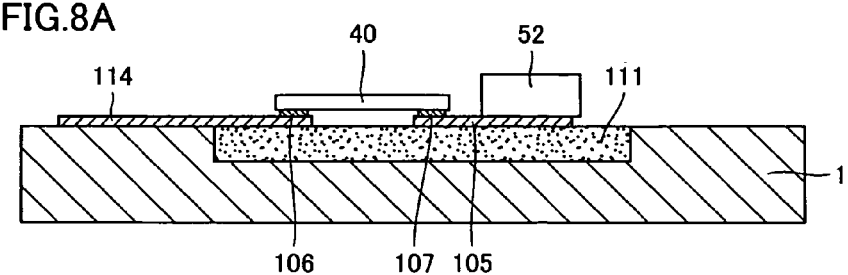
FIGS. 8A and 8B illustrate an assembly process of the wafer-type thermometer.
Figure 8B:
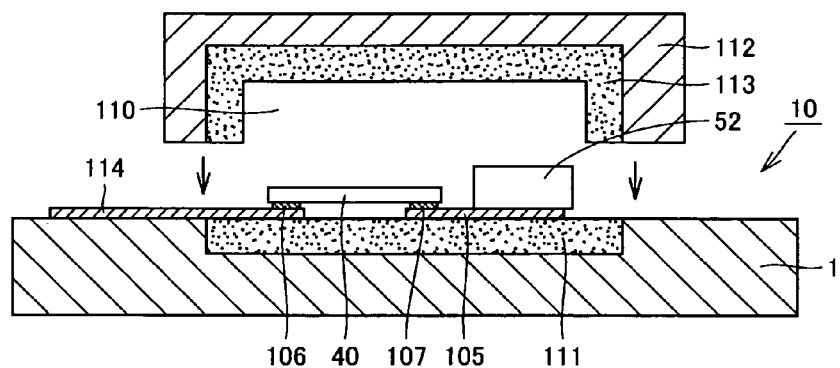

FIGS. 6 to 8 illustrate a method for manufacturing the storage room 110 of the wafer-type thermometer shown in FIG. 5: FIGS. 6A and 6B show a process for forming the heat insulating layer 111 on the wafer 1; FIGS. 7A to 7D show a process for forming the heat insulating layer 113 on the substrate 112; and FIGS. 8A and 8B show an assembly process.

The wafer 1 in FIG. 6A includes a plurality of temperature sensors 21, 22 to 2n formed therein, but their illustrations are omitted. A resist 117 is applied over this wafer 1 except for a part that will be the bottom of the storage room 110 shown in FIG. 5. A heat insulating layer 111 is formed on the part that is not coated with the resist 117. The heat insulating layer 111 is made of a nanocrystalline silicon layer. The nanocrystalline silicon layer is formed by anodizing process for example, but can be formed by a CVD method, ion implantation or the like. With these sort of methods, a Si crystal layer of 4 nm to 5 nm in size can be formed on the Si wafer. These nanosized Si crystals that have a quantum effect make the Si wafer porous. This porous Si wafer obtains good heat insulation, therefore providing the heat insulation effect. After the formation of the heat insulating layer 111 made of the nanocrystalline silicon layer, the resist 117 is removed.

Next, a substrate 112 is prepared as shown in FIG. 7A, then applied with a resist 115 on the outer region thereof as shown in FIG. 7B, and etched to form a recess 116 as shown in FIG. 7C. A resist 118 is applied on the substrate 112 except for a part that will be a heat insulating layer 113 in the same manner as FIG. 6B. Then, a nanocrystalline silicon layer is formed at the bottom and sides of the recess 116 by, for example, the anodizing process to form the heat insulating layer 113 surrounding the storage room 110 as shown in FIG. 7C. After that, the resist 118 is removed.

As shown in FIG. 8A, the wiring conductor 105 is formed on the heat insulating layer 111, while the wiring conductor 114 is formed so as to cross the wafer 1 and heat insulating layer 111. The wiring conductor 105 is connected to an electrode of the battery 52 and also connected to the integrated circuit 40 with conductive paste 107. The wiring conductor 114 and integrated circuit 40 are connected with conductive paste 106.

Further, as shown in FIG. 8B, the substrate 112, functioning as a cap member, with the storage room 110 formed therein is overlaid so as to cover the integrated circuit 40 and battery 52. According to the above mentioned processes, the wafer-type thermometer 10 is completed. Although the heat insulating layers 111 and 113 are made of the nanocrystalline silicon layer in the above description, the material of the heat insulating layer is not limited to this and can be other insulating materials.

Figure 9:
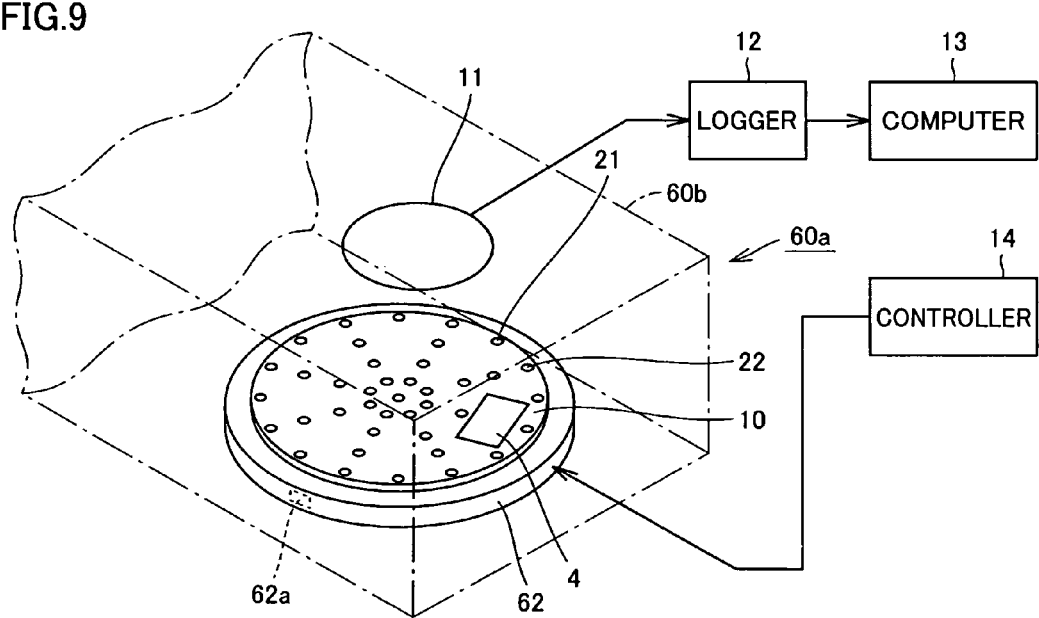
FIG. 9 illustrates an example of the wafer-type thermometer shown in FIG. 1 disposed in the heating/cooling system in the case of transmitting temperature data by radio.

FIG. 9 illustrates an example of the heating/cooling system 60a with the wafer-type thermometer 10 shown in FIG. 1 arranged therein to measure temperature.

Figure 16:
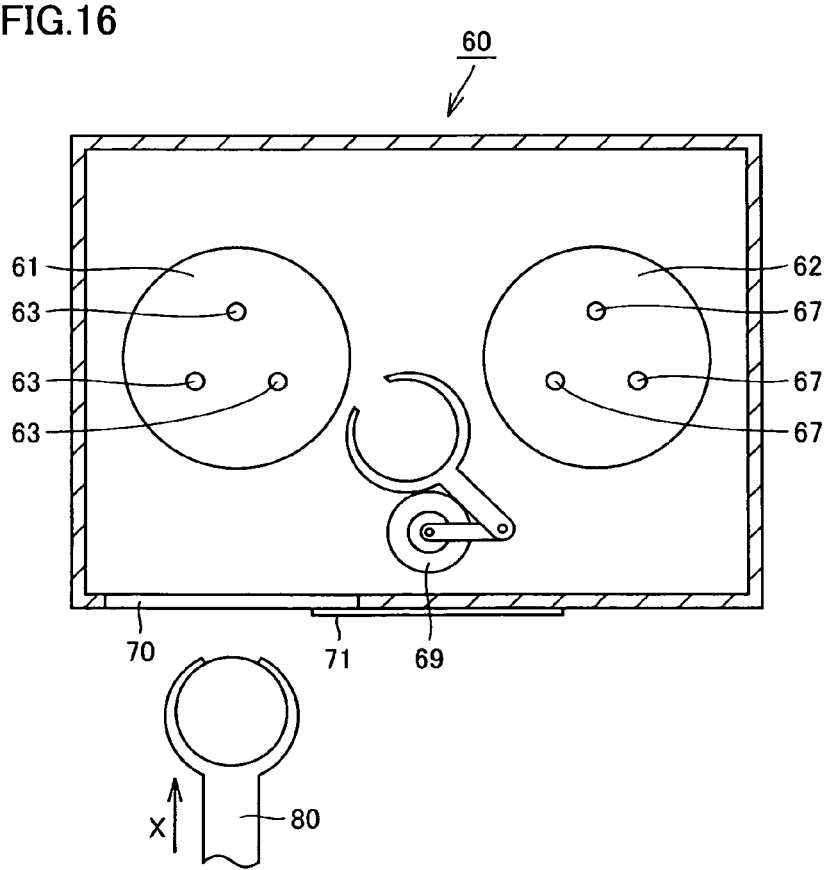
FIG. 16 is a transverse sectional view taken along lines A-A of FIG. 15.
Figure 17A:
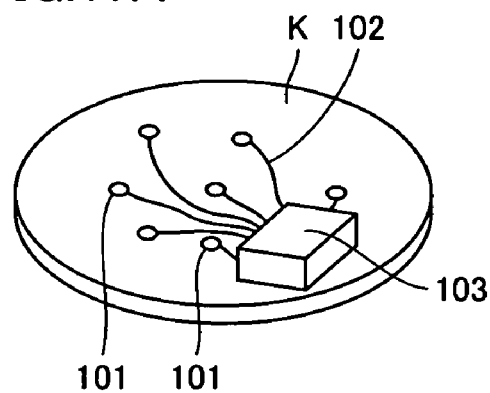
FIGS. 17A and 17B illustrate examples of the conventional temperature measuring device.
Figure 17B:
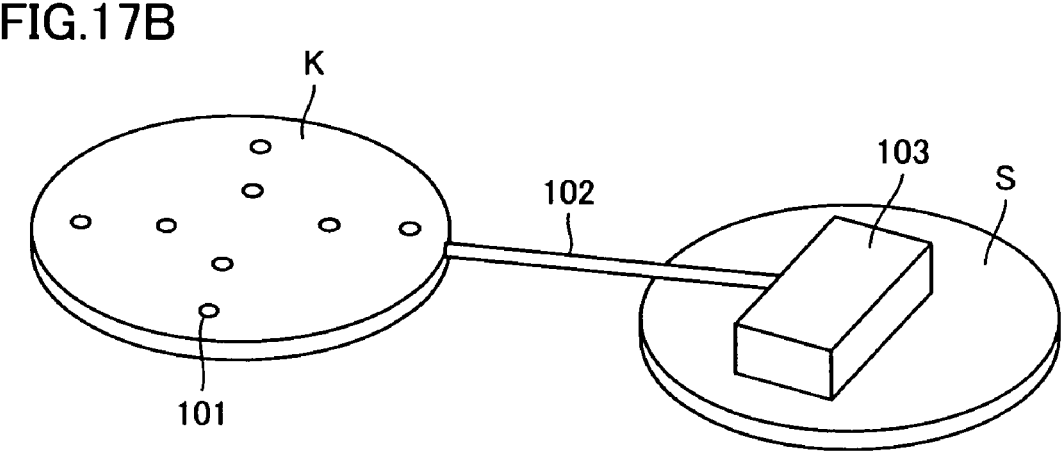

In FIG. 9, the heating/cooling system 60a has generally the same structure as that of the heating/cooling system 60 shown in FIGS. 15 and 16. The heating plate 62, functioning as a stage, discussed in FIG. 15 is placed in an enclosure 60b. Note that the cooling plate 61 is not illustrated herein. The heating plate 62 incorporates a heating-plate temperature sensor 62a. An antenna 11 is attached to the ceiling of the enclosure 60b. The antenna 11 comprises, for example, a spiral wound coil made from a conductor. The antenna 11 captures data transmitted from the wafer-type thermometer 10 by radio to feed the data to the logger 12. The logger 12 samples the received data per sampling time to convert them into time-series data. Each of the time-series data is numerically processed to obtain an average value, deviation value and so on, then displayed, and output to a computer 13 as temperature data.

The computer 13 has a program installed to calculate a correction value to adjust temperature of the heating plate 62 based on the preset temperature T of the heating plate 62 and the obtained temperature data. When receiving the temperature data from the logger 12, the computer 13 automatically runs the program, for example, and calculates the correction value according to a constant algorithm. A controller 14 controls a heater (not shown) incorporated in the heating plate 62 based on the temperature measured by the heating-plate temperature sensor 62a which has the same temperature characteristics as the wafer-type thermometer 10.

Figure 10:
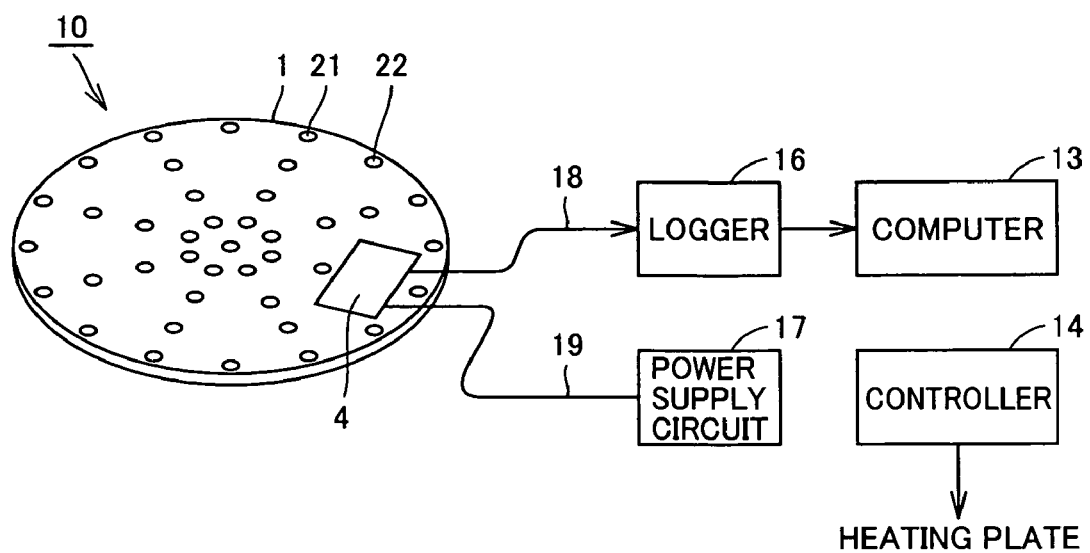
FIG. 10 illustrates an example of the wafer-type thermometer shown in FIG. 1 disposed in the heating/cooling system in the case of transmitting temperature data by wire.

FIG. 10 illustrates an embodiment in which the wafer-type thermometer 10 and logger 16 are connected by wire. The conversion processing circuit 4 of the wafer-type thermometer 10 and the logger 16 are connected to each other via a cable 18. When the conversion processing circuit 4 is not supplied with power from the battery, the conversion processing circuit 4 of the wafer-type thermometer 10 is connected to a power supply circuit 17 via a cable 19. The logger 16 samples the data input through the cable 18 per sampling time to convert them into time-series data. Each of the time-series data is numerically processed to obtain an average value, deviation value and so on, then displayed, and output to the computer 13 as temperature data.

Since the logger 16 directly receives the temperature data detected by the temperature sensors 21, 22 to 2n arranged in the respective regions on the wafer-type thermometer 10 in this embodiment shown in FIG. 10, each region on the wafer 1 can be identified. On the contrary, the embodiment in which the temperature data from the wafer-type thermometer 10 is transmitted by radio as shown in FIG. 9 needs to identify the regions. In order to identify the regions, there are applicable methods in which the temperature data detected by each of the temperature sensors 21, 22 to 2n are transmitted in a time division manner by the conversion processing circuit 4 and recognized by the logger 12 to determine the temperatures of the respective regions.

Figure 11A:
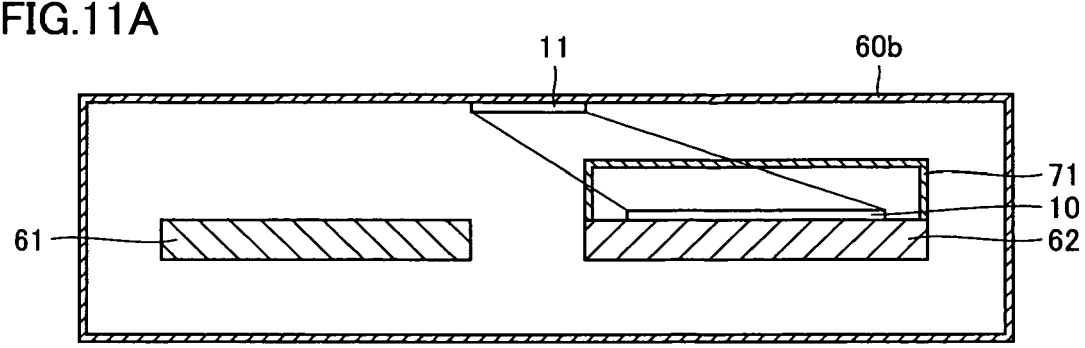
FIGS. 11A, 11B, 11C are explanatory drawings of an example of the wafer-type thermometer according to one embodiment of the invention, to describe the way of measuring the temperature of the heating plate and cooling plate.
Figure 11B:
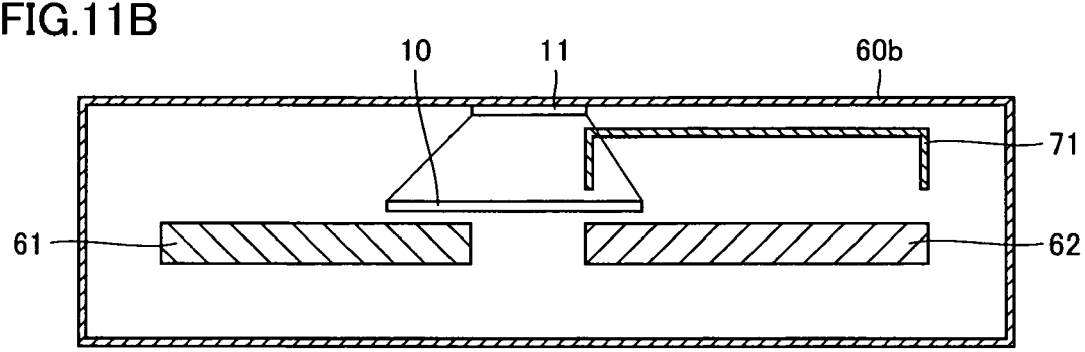
Figure 11C:
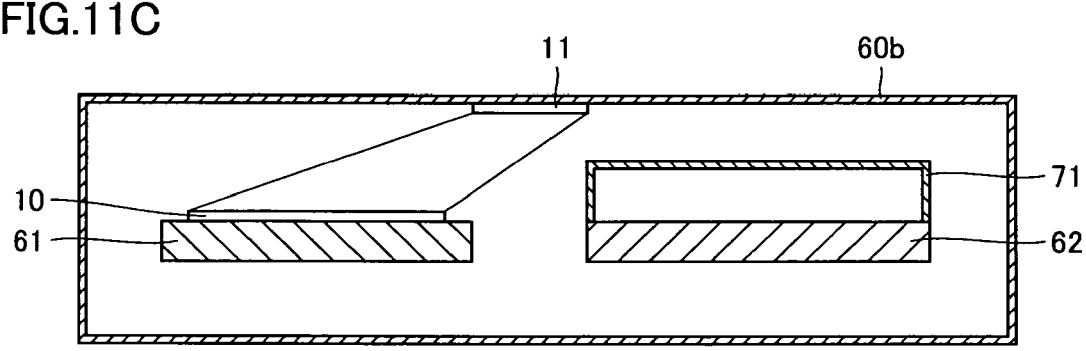

FIGS. 11A to 11C are explanatory drawings of a method for measuring temperature of the heating plate 62 and cooling plate 61 with the wafer-type thermometer 10 according to one embodiment of the invention. In FIG. 11A, the cooling plate 61 and heating plate 62 are disposed in an enclosure 60b in the same manner as FIG. 15. Each of the cooling plate 61 and heating plate 62 is also attached with a vertical drive mechanism discussed in FIG. 15, but its illustration is omitted. An openable cover member, or a chamber cover 71 is mounted on the heating plate 62.

On a part of the ceiling of the enclosure 60b positioned between the cooling plate 61 and heating plate 62 disposed is the antenna 11 discussed in FIG. 9. Since the antenna 11 is not located right above the heating plate 62, the antenna 11 can be prevented from temperature rise. The chamber cover 71 has a window (not shown) allowing a wave to pass therethrough. The logger 12, computer 13 and controller 14 shown in FIG. 9 are located away from the heating plate 62 and in an atmosphere at room temperature.

By referring to FIGS. 11A to 11C, the temperature measurement method will be described. First, a wafer-type thermometer 10 is transferred through a transfer opening (not shown) of the enclosure 60b by the transfer arm discussed in FIG. 16, and then the chamber cover 71 on the heating plate 62 is lifted open. Next, the wafer-type thermometer 10 is transferred onto the heating plate 62 by the transfer device discussed in FIG. 16, and then is placed so as to have the regions in proper alignment. Subsequently, as shown in FIG. 11A, the chamber cover 71 descends to close the upper part of the heating plate 62. When the temperature data transmitted from the wafer-type thermometer 10 are captured by the antenna 11, the chamber cover 71 is again lifted as shown in FIG. 11B, and then the wafer-type thermometer 10 is transferred by the transfer device from the heating plate 62 to the cooling plate 61.

Even during transfer, the temperature data is continuously transmitted from the wafer-type thermometer 10 via the antenna 11. Since the temperature data can be received via the antenna 11 even after the wafer-type thermometer 10 has been transferred onto the cooling plate 61 as shown in FIG. 11C, it is possible to detect the temperatures of the respective regions on the wafer-type thermometer 10. Thus, the wafer-type thermometer 10 enables detection of the temperatures after being cooled.

As mentioned above, the example shown in FIGS. 11A to 11C enables receipt of the temperature data via the antenna 11 even during heating treatment by the heating plate 62 and cooling treatment by the cooling plate 61, and therefore continuous measurement of the heating temperature and cooling temperature can be achieved.

Figure 12A:
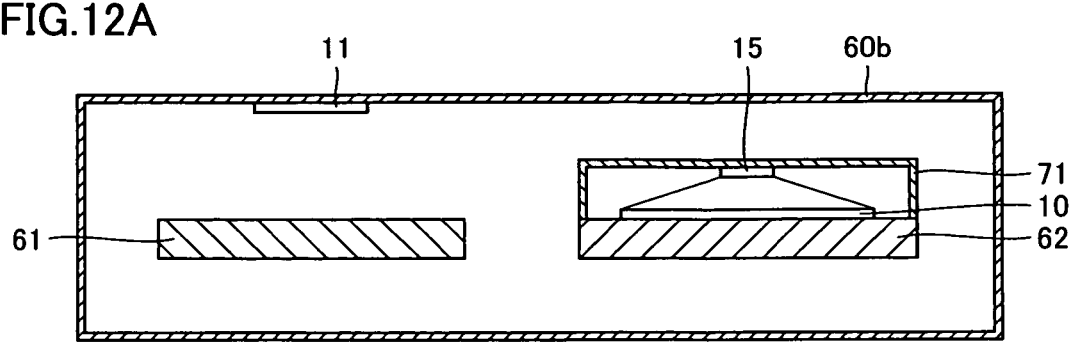
FIGS. 12A, 12B, 12C are explanatory drawings of another example of the wafer-type thermometer according to one embodiment of the invention, to describe the way of measuring the temperature of the heating plate and cooling plate.
Figure 12B:
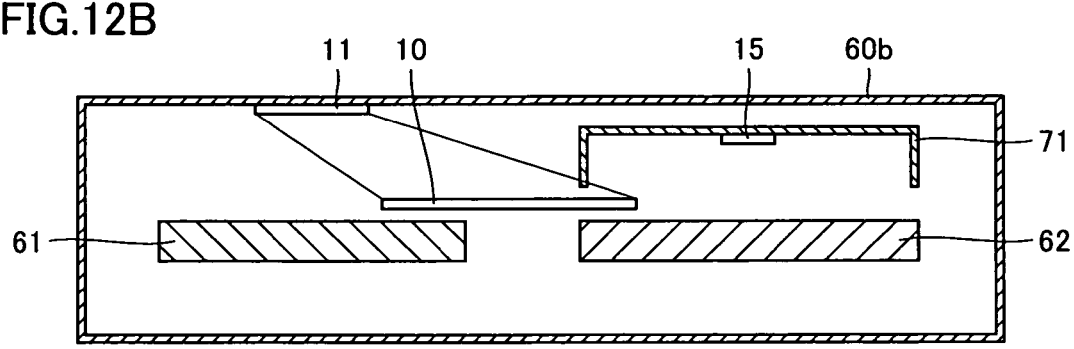
Figure 12C:
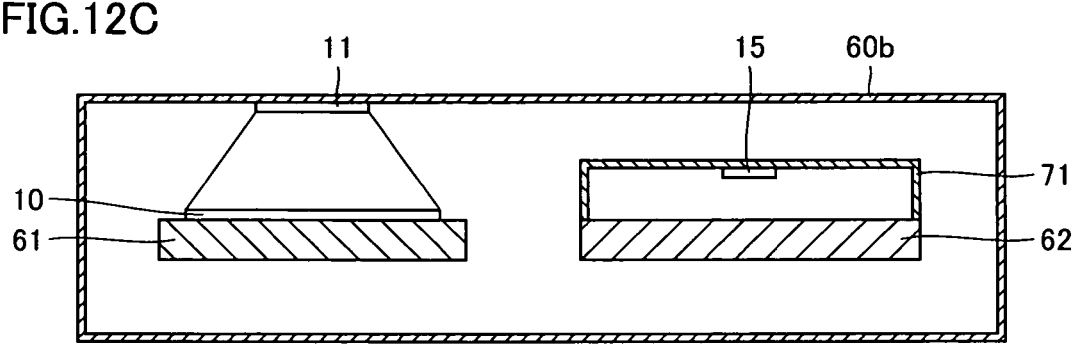

FIGS. 12A to 12C are explanatory drawings of another example of the method for measuring temperature of the heating plate 62 and cooling plate 61 with the wafer-type thermometer 10 according to one embodiment of the invention.

In this example, the antenna 11 is attached to the ceiling of the enclosure 60b and above the cooling plate 61, and an auxiliary antenna 15 is disposed in the chamber cover 71. The auxiliary antennas 15 disposed in the chamber cover 71 may be plural. When the chamber cover 71 is opened, the wafer-type thermometer 10 is transferred onto the heating plate 62. As shown in FIG. 12A, the temperature data of the respective regions on the wafer-type thermometer 10 can be received via the auxiliary antenna 15.

Upon completion of the heat treatment, as shown in FIG. 12B, the chamber cover 71 is opened, and then the wafer-type thermometer 10 is transferred from the heating plate 62 to the cooling plate 61. At this point, the auxiliary antenna 15 is switched to the antenna 11 above the cooling plate 61 to receive the temperature data from the wafer-type thermometer 10 in the middle of transfer. As shown in FIG. 12C, after the wafer-type thermometer 10 is transferred onto the cooling plate 61, the temperature data is received via the antenna 11.

In this example, the auxiliary antenna 15 is made of metallic materials capable of resisting high temperatures of 200 degrees C. and higher. The logger 12, computer 13 and controller 14 shown in FIG. 9 are located away from the heating plate 62, that is in an atmosphere at room temperature.

As mentioned above, the example shown in FIGS. 12A to 12C enables receipt of the temperature data via the auxiliary antenna 15 during heating treatment by the heating plate 62 and via the antenna 11 during cooling treatment by the cooling plate 61, and therefore continuous measurement of the heating temperature and cooling temperature can be achieved.

Figure 13A:
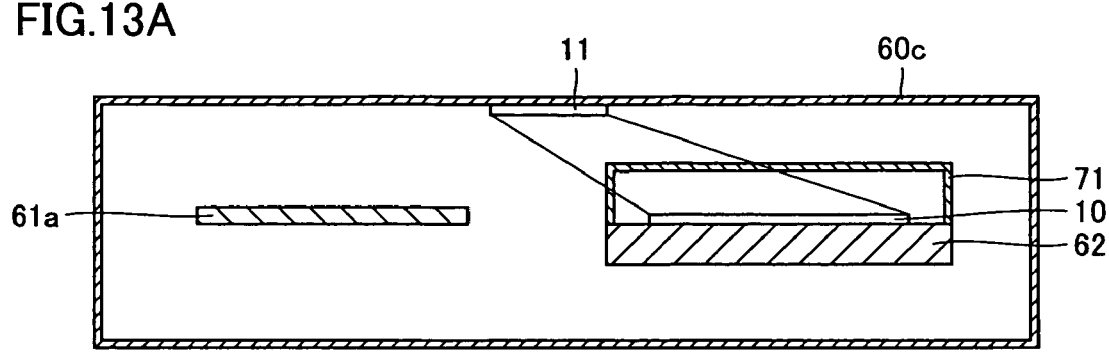
FIGS. 13A, 13B, 13C are explanatory drawings of yet another example of the temperature measuring device having a temperature measurement function according to one embodiment of the invention, to describe the way of measuring the temperature of the heating plate and cooling plate.
Figure 13B:
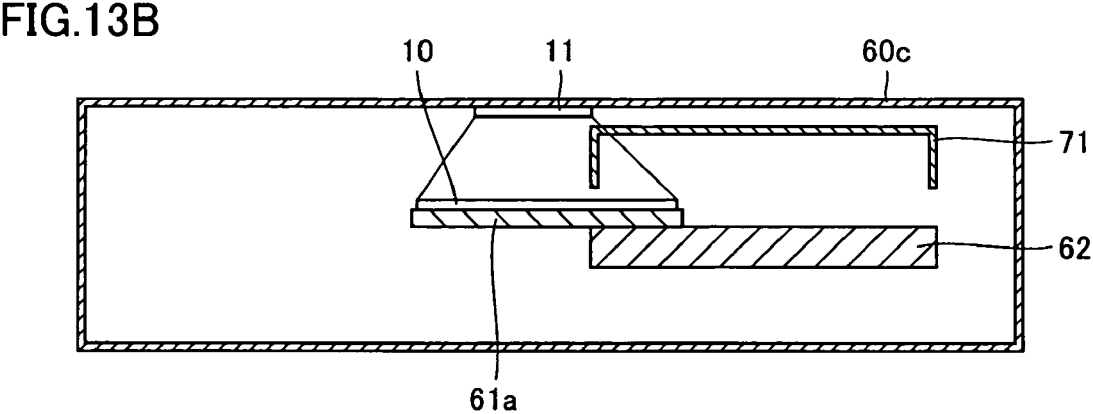
Figure 13C:
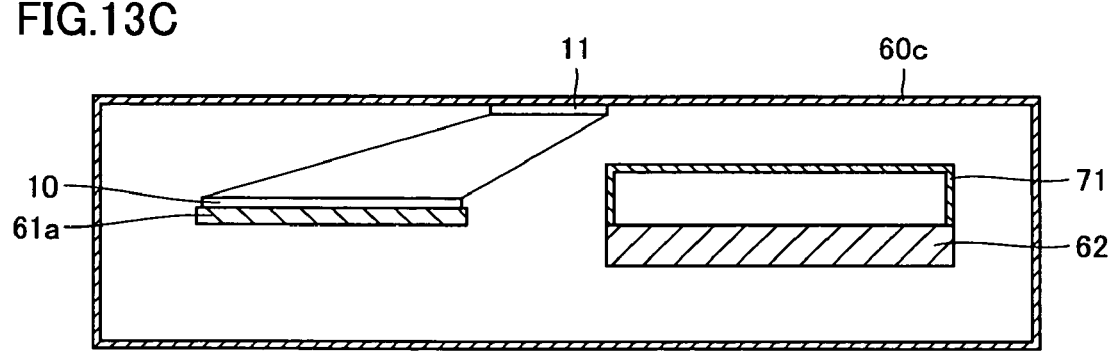

FIGS. 13A to 13C are explanatory drawings of yet another example of the method for measuring temperature of the heating plate and cooling plate with the temperature measuring device having a temperature measurement function according to one embodiment of the present invention.

Although the aforementioned examples shown in FIGS. 11A to 12C are configured to include the cooling plate 61 and transfer device 69 separately in the same manner as shown in FIG. 16, the example shown in FIGS. 13A to 13C is configured to include the cooling plate 61a having a wafer transfer function. Other components of the example shown in FIGS. 13A to 13C are the same as those of the example shown in FIG. 16.

First, after the chamber cover 71 is lifted open, the cooling plate 61a receives the wafer-type thermometer 10 that is transferred to the transfer opening and transfers it onto the heating plate 62. Next, the chamber cover 71 descends to close the heating plate 62. Subsequently, temperature data transmitted from the wafer-type thermometer 10 is receipt via the antenna 11. Upon completion of the heat treatment, as shown in FIG. 13B, the chamber cover 71 is lifted, and then the cooling plate 61a moves onto the heating plate 62 to pull out the wafer-type thermometer 10 from the heating plate 62.

Even during transfer, the temperature data is continuously transmitted from the wafer-type thermometer 10 via the antenna 11. Subsequently, as shown in FIG. 13C, the cooling plate 61a stops the transferring operation. Since the temperature data can be received via the antenna 11 even in this situation, it is possible to detect the temperatures of the respective regions on the wafer-type thermometer 10. After that, the wafer-type thermometer 10 is taken out by the transfer arm.

Figure 14A:
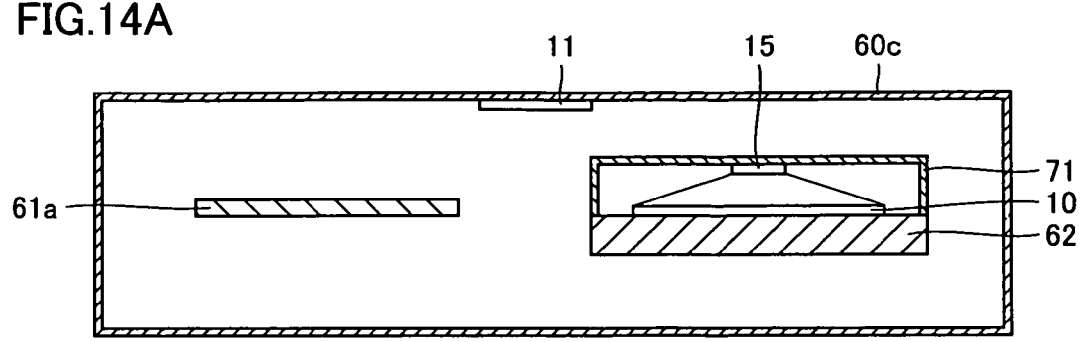
FIGS. 14A, 14B, 14C are explanatory drawings of yet another example of the temperature measuring device having a temperature measurement function according to one embodiment of the invention, to describe the way of measuring the temperature of the heating plate and cooling plate.
Figure 14B:
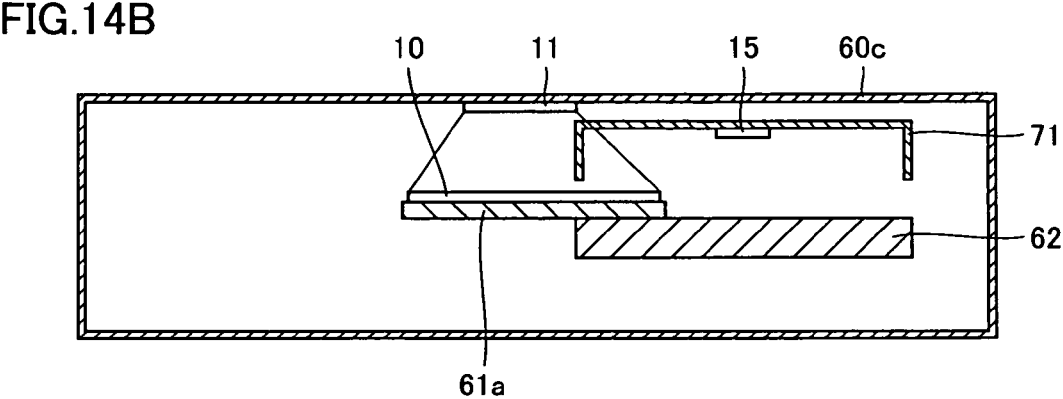
Figure 14C:
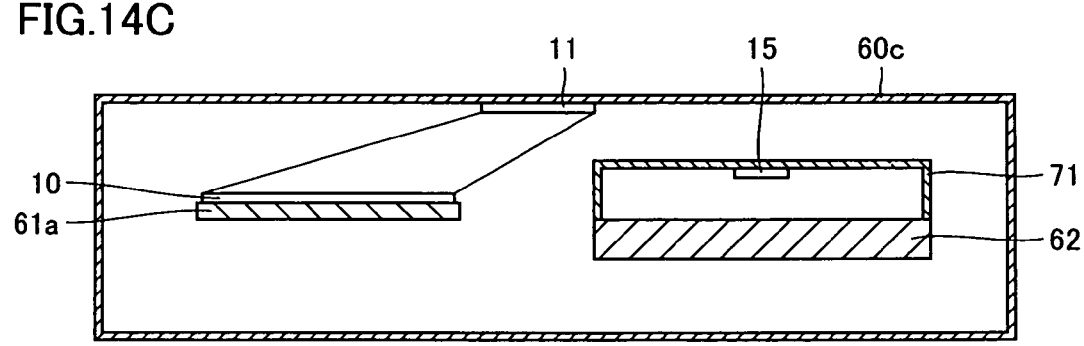

FIGS. 14A to 14C are explanatory drawings of yet another example of the method for measuring temperature of the heating plate and cooling plate with the temperature measuring device having a temperature measurement function according to one embodiment of the present invention.

Similar to the example shown in FIGS. 12A to 12C, this example includes the antenna 11 attached to the ceiling of the enclosure 60c and above the cooling plate 61a, the auxiliary antenna 15 located in the chamber cover 71 and the cooling plate 61a having a wafer transfer function. Since the transferring operation, heating operation and cooling operation are performed in the same manner as the example shown in FIGS. 11A to 11C and the communication of the signals between the wafer-type thermometer 10 and antennas 11, 15 is also performed in the same manner as the example shown in FIGS. 12A to 12C, their descriptions are not reiterated.

The foregoing has described the embodiments of the present invention by referring to the drawings. However the invention should not be limited to the illustrated embodiments. It should be appreciated that various modifications and changes can be made to the illustrated embodiments within the scope of the appended claims and their equivalents.

The wafer-type thermometer and the method for manufacturing the wafer-type thermometer according to embodiments of the present invention are utilized to measure surface temperature of a wafer mounted on the cooling plate or heating plate in a heating/cooling system.

What is claimed is:

1. A wafer-type thermometer comprising:
a wafer;
a plurality of temperature sensors arranged in regions formed by segmenting the upper surface of said wafer into a plurality of regions;
a conversion processing circuit configured to convert output signals from said plurality of temperature sensors into temperature data and processing said temperature data; and
a storage room provided on said wafer, said storage room being surrounded by a heat insulating member made of a nanocrystalline silicon (nc-Si) layer and housing said conversion processing circuit.

2. The wafer-type thermometer according to claim 1, wherein
said storage room houses a battery for supplying power supply voltage to said conversion processing circuit.

3. The wafer-type thermometer according to claim 1, wherein
said heat insulating member has an opening therethrough,
said battery is provided with a part thereof exposed through the opening, and said battery is a Peltier thermobattery generating a voltage in response to a temperature difference between the temperature inside said heat insulating member and the temperature outside said heat insulating member.

4. The wafer-type thermometer according to claim 3, wherein
said storage room includes therein a constant voltage circuit for regulating the voltage generated by said Peltier thermobattery to a constant voltage.

5. The wafer-type thermometer according to claim 1, wherein
said conversion processing circuit includes a memory for storing said temperature data.

6. The wafer-type thermometer according to claim 1, wherein
said conversion processing circuit includes a transmitter circuit for transmitting said temperature data by radio.

7. The wafer-type thermometer according to claim 1, wherein
said conversion processing circuit includes an interface circuit for outputting said temperature data by wire.

8. A wafer-type thermometer comprising:
a wafer;
a plurality of temperature sensors arranged in regions formed by segmenting the upper surface of said wafer into a plurality of regions;
conversion processing circuit configured to convert output signals from said plurality of temperature sensors into temperature data and processing the temperature data;
a storage room provided in said wafer, said storage room being surrounded by heat insulating member and housing said conversion processing circuit;
a Peltier thermobattery housed in said storage room so as to expose a part thereof from said storage room to the outside of said wafer, said Peltier thermobattery generating a voltage in response to a temperature difference between the temperature inside said heat insulating member and the temperature outside said heat insulating member to supply the voltage as power supply voltage to said conversion processing circuit.

9. A method for manufacturing a wafer-type thermometer that measures temperature of a wafer, the method comprising steps of:

forming temperature sensors distributed in regions formed by segmenting the upper surface of said wafer into a plurality of regions;

forming a heat insulating part made of a nanocrystalline silicon layer in an area, in which the temperature sensors are not formed, on the upper surface of said wafer;

placing a conversion processing circuit on said heat insulating part, said conversion processing circuit being for processing output signals from said temperature sensors; and covering said conversion processing circuit by placing a cap member having a heat insulating part made of a nanocrystalline silicon layer on an area opposite the heat insulating part of said wafer.

* * * * *